United States Patent
Shiraishi et al.

[11] Patent Number: 6,130,972
[45] Date of Patent: Oct. 10, 2000

[54] LENSED OPTICAL FIBER AND LASER MODULE

[75] Inventors: Kazuo Shiraishi, Saitama; Isamu Ohishi, Yokohama, both of Japan

[73] Assignee: The Furukawa Electric Co., Ltd., Tokyo, Japan

[21] Appl. No.: 09/239,432

[22] Filed: Jan. 28, 1999

[30] Foreign Application Priority Data

Feb. 4, 1998 [JP] Japan .................... 10-023525

[51] Int. Cl.⁷ .................................................. G02B 6/32

[52] U.S. Cl. .................. 385/33; 385/34; 385/49; 385/93; 385/124

[58] Field of Search .................. 385/33, 34, 49, 385/93, 124

[56] References Cited

U.S. PATENT DOCUMENTS

| | | | |
|---|---|---|---|
| 4,812,006 | 3/1989 | Osborn et al. | ........... 350/96.21 |
| 5,774,607 | 6/1998 | Shiraishi et al. . | |

*Primary Examiner*—Cassandra Spryou
*Assistant Examiner*—Craig Curtis
*Attorney, Agent, or Firm*—Frishauf, Holtz, Langer & Chick, P.C.

[57] ABSTRACT

A lensed optical fiber and a semiconductor laser module, characterized in that first and second optical fibers, each including a core and a cladding, are connected to one end of a single-mode fiber, including a core and a cladding, in the order named. The core of the first optical fiber has a first square-low index distribution and a length substantially equal to ¼ of the meandering period of light propagating through the core or an odd multiple thereof. The core of the second optical fiber has a second square-low index distribution and a meandering period different from that of the first optical fiber.

4 Claims, 6 Drawing Sheets

LENSED OPTICAL FIBER AND LASER MODULE

BACKGROUND OF THE INVENTION

1. Field of the Invention

The present invention relates to optical circuit elements used mainly in the fields of optical communication and sensors, and more particularly, to a lensed optical fiber coupled to a semiconductor laser with high efficiency and a laser module.

2. Description of the Prior Art

A technique for coupling a semiconductor laser and an optical fiber with high efficiency is one of the most important techniques in the field of optical communication. Conventionally, for example, there is a method that uses a lens such as a spherical or nonspherical lens. Another method is based on the use of a hemispherically-ended fiber that has a spherical distal end.

Although the method that uses the lens can enjoy a relatively high coupling efficiency, it entails troublesome alignment between the semiconductor laser, lens, and optical fiber, and requires a coupling system of a substantial size. Further, the lens used in this method is so bulky and occupies so wide a space that the method cannot be applied to coupling between a semiconductor laser array and an optical fiber array, in which a plurality of semiconductor lasers or optical fibers are arranged at short intervals.

On the other hand, the method based on the use of the hemispherically-ended fiber is applicable to coupling between laser and fiber arrays, since the hemispherically-ended fiber is small-sized. FIG. 8 shows the simplest structure of the hemispherically-ended fiber. In a hemispherically-ended fiber 1 shown in FIG. 8, a hemispherical lens portion 1c is formed integrally on the distal end of a single-mode fiber that includes a core 1a and a cladding 1b.

In order to couple the hemispherically-ended fiber 1 and the semiconductor laser without lowering the coupling efficiency to an extreme degree, the radius of curvature of the lens portion 1c and the distance between the lens portion 1c and the end face of the semiconductor laser, i.e., working distance, must be adjusted to about 10 μm, which is equivalent to the core diameter of the fiber 1. In assembling the coupling system that combines the hemispherically-ended fiber 1 and the semiconductor laser, therefore, the laser and the fiber 1 may run against one another, thereby getting out of order.

Accordingly, there have already been proposed some means for elongating the working distance of the hemispherically-ended fiber.

For example, there is a known optical fiber in which a coreless fiber, having a uniform refractive index and a spherical distal end, is connected integrally to the distal end of a single-mode fiber. With this optical fiber, the working distance can be set at 100 μm or more, and the collision between the laser and the fiber can be avoided.

In the optical fiber having the coreless fiber connected to the distal end of single-mode fiber, the distal end of the coreless fiber is spherical, so that the coupling efficiency is lowered by spherical aberration. More specifically, light beams that are emitted from the laser end face reach the end face of the single-mode fiber in varied positions and at different angles, depending on their angles of emission. Therefore, some light beams may fail to reach the core or may reach the core wider than the critical angle at angles of incidence, thus failing to become ones that propagate through the single-mode fiber, so that the coupling efficiency is lowered. For example, the coupling loss is at 6 dB or thereabout if the semiconductor laser used is a standard one.

In order to solve the above problem, there is proposed a lensed fiber (e.g., U.S. Pat. No. 5,774,607, etc.) in which one end of a single-mode fiber that includes a core and a cladding and the other end of a coreless fiber are connected by means of a square-law index fiber that has a square-low index distribution of a length equal to ¼ of the meandering period of propagative light or an odd multiple thereof.

FIG. 9 shows a lensed fiber 5 that is proposed as a simplified version of the aforementioned lensed fiber. In this fiber 5, a square-law index fiber 7 that has a square-low index distribution of a length equal to ¼ of the meandering period of propagative light or an odd multiple thereof is connected to a single-mode fiber 6 that includes a core 6a and a cladding 6b. The square-low index fiber 7, which includes a core 7a and a cladding 7b, has a hemispherical distal end.

When these two different optical fibers were coupled to a semiconductor laser, the coupling loss was reduced to about 4 dB or thereabout, which does not comply with the practical requirement, 3 dB or less.

In general, the smaller the coupling loss between a semiconductor laser and an optical fiber, the higher the performance of an optical communication system is, and the easier the construction of the system is.

However, the technique associated with the conventional lensed optical fibers, including the lensed fiber 5 shown in FIG. 9, cannot concurrently fulfill the two requirements, maintenance of a long working distance and reduction of the coupling loss.

SUMMARY OF THE INVENTION

The object of the present invention is to provide a lensed optical fiber and a laser module, capable of reducing the coupling loss without failing to maintain a long working distance.

In order to achieve the above object, the inventors hereof analyzed the optical condensing characteristic of the conventional lensed fiber 5 shown in FIG. 9 by a method based on geometric optics.

FIG. 10 shows trajectories obtained when light beams emitted from a semiconductor laser at angles θ1=10°, θ2=15°, and θ3=20°, individually, propagate through the square-low index fiber 7. In FIG. 10, the axis of ordinate represents the position (μm) relative to the fiber axis, while the axis of abscissa represents the distance of propagation (μm) from the position of incidence upon the fiber 7. FIG. 10 illustrates the case where a parameter Ag associated with the convergence characteristic is 200 μm. In this case, the radius of curvature of the distal end of the fiber 7 and the working distance are supposed to be 75 μm and 50 μm, respectively, and the parameter Ag is defined as Ag=a/(2Δ)1/2, where Δ and a is the specific refractive index difference of the square-low index fiber 7 and the core radius, respectively.

After a light beam emitted from the semiconductor laser is projected on the square-low index fiber 7, its inclination (differential value) against the fiber axis gradually decreases, and the light beam becomes parallel to the fiber axis at a point where the propagation distance is about 200 μm. Thereafter, the light beam is gradually condensed, and is maximally condensed at a point where the propagation distance is about 500 μm.

FIG. 11 shows the relation between an incidence position h of the light beam measured in the radial direction from the fiber axis and an angle of incidence φ (degrees) compared to the fiber axis, at the point where the propagation distance of the square-low index fiber 7 is about 500 μm. This relation is examined with the angle of emission from the semiconductor laser varied by degrees and indicated by circles (O). A black dot (●) in the center represents a light beam on the fiber axis. The light beams that can be coupled to the single-mode fiber must be incident within the range indicated by an oblong of FIG. 11 corresponding to apertures and the number of apertures.

As seen from FIG. 11, the light beams incident upon the square-low index fiber 7 change in an S-shaped curve long from side to side as the angle of emission increases.

The tenth light beams counted in both directions from the light beam on the fiber axis indicated by the black dot (●) in the center, that is, the light beams that are emitted from the semiconductor laser at angles wider than 9°, are incident outside the oblong of FIG. 11, and cannot be coupled to the single-mode fiber. This constitutes a hindrance to satisfactory reduction in the coupling loss.

Thus, the coupling loss should be able to be further reduced if the incidence angle φ between each light beam and the fiber axis can be narrowed.

Thereupon, the inventors hereof noticed a feature of the trajectories of the light beams shown in FIG. 10 such that the light beams become parallel to the fiber axis at the point where the propagation distance is about 200 μm. More specifically, the incidence angle φ (degrees) at the point of convergence between each light beam and the fiber axis should be able to be narrowed by connecting another square-low index fiber having a longer condensing distance to a point on the side of the single-mode fiber 6. In this case, the length of the another second square-low index fiber should be adjusted to about ¼ of the meandering period of the light beam or an odd multiple thereof. In terms of Ag, the length equal to ¼ of the meandering period can be given by πAg/2.

A lensed optical fiber and a laser module according to the present invention are created in accordance with the result of the analysis of the optical condensing characteristic of the conventional lensed fiber based on geometric optics. The lensed optical fiber is designed so that first and second optical fibers, each including a core and a cladding, are connected to one end of a single-mode fiber, including a core and a cladding, in the order named, the core of the first optical fiber having a first square-low index distribution and a length substantially equal to ¼ of the meandering period of light propagating through the core or an odd multiple thereof, and the core of the second optical fiber having a second square-low index distribution and a meandering period different from that of the first optical fiber.

Preferably, the distal end of the second optical fiber has a convex surface.

Preferably, moreover, the second optical fiber is connected with an isotropic coreless fiber having a convex distal end.

On the other hand, the laser module is designed so that a laser source and the lensed optical fiber are opposed to each other in a manner such that a predetermined working distance is kept between the second optical fiber and the laser source.

According to a preferred embodiment of the lensed optical fiber and the laser module of this invention, there may be provided a coupling system that can reduce the coupling loss without failing to maintain a long working distance.

Further, all the components of the lensed optical fiber of the invention are in the form of fibers, and the entire structure is small-sized and light in weight. Furthermore, the lensed optical fiber of the invention are fiber-shaped structures that can be manufactured by directly utilizing the existing fiber fusion splicing technique. Thus, the manufacture of these structures is so easy that they can be mass-produced.

The above and other objects, features, and advantages of the invention will be more apparent from the ensuing detailed description taken in connection with the accompanying drawings.

DETAILED DESCRIPTION OF THE PREFERRED EMBODIMENTS

A lensed optical fiber and a laser module according to one embodiment of the present invention will now be described in detail with reference to the accompanying drawings of FIGS. 1 to 7.

Figure 1:
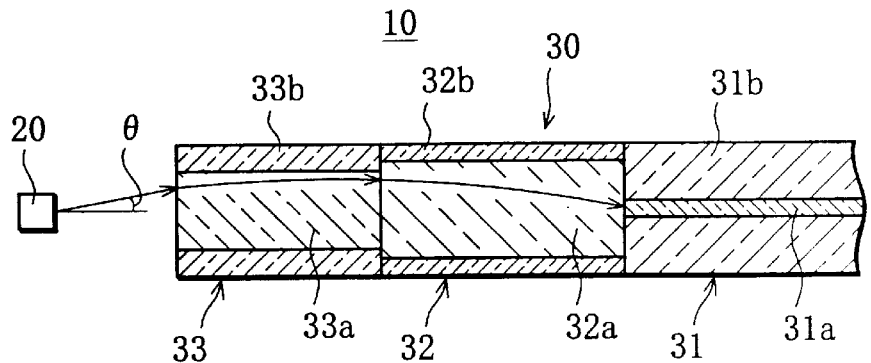
FIG. 1 is a side view showing outlines of a lensed optical fiber and a semiconductor laser module according to the present invention.

In a semiconductor laser module 10, as shown in FIG. 1, a semiconductor laser 20 and a lensed optical fiber 30 are opposed at a working distance of about 50 μm from each other.

The semiconductor laser 20 has a peak oscillation wavelength of 1,330 nm, operating current of 16 mA, operating voltage of 1.0 V, horizontal-radiation full width at half maximum of 20°, and vertical-radiation full width at half maximum of 25°.

In the lensed optical fiber 30, first and second fibers 32 and 33 are connected in succession to one end of a single-mode fiber 31, which includes a core 31a and a cladding 31b.

The first fiber 32, which includes a core 32a and a cladding 32b, is an optical fiber with a first square-low index distribution that has a length substantially equal to ¼ (=785 μm) of the meandering period of light propagating through the core 32a or an odd multiple thereof. The first fiber 32 has a parameter Ag=500 μm.

The second fiber 33, which includes a core 33a and a cladding 33b, is an optical fiber with a square-low index distribution 200 μm long, and its parameter Ag is 200 μm. The second fiber 33 differs from the first fiber 32 in the meandering period of light propagating through the core 33a.

The lensed optical fiber 30 with the above-described construction is manufactured in the following manner.

Figure 2A:
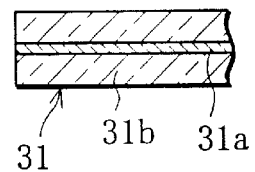
FIGS. 2A to 2D are views for illustrating manufacturing processes for the lensed optical fiber of FIG. 1.
Figure 2B:
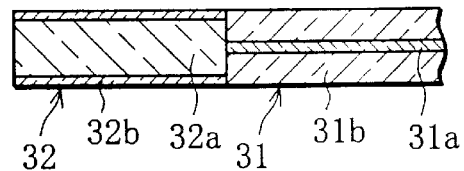

First, the first fiber 32 with the square-low index distribution is connected to the one end of the single-mode fiber 31 shown in FIG. 2A by fusion splicing using a fusion splicer. Thereafter, the first fiber 32 is cut to the length equal to ¼ of the meandering period of the light propagating through the core 32a (FIG. 2B).

Figure 2C:
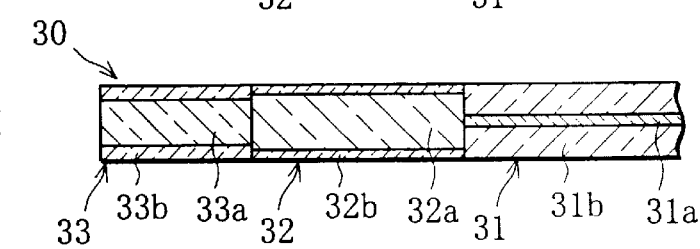

Then, the second fiber 33, which has the square-low index distribution and meandering period or parameter Ag different from those of the first fiber 32, is connected to the first fiber 32 and cut to a suitable length in like manner, whereupon the lensed optical fiber 30 is obtained (FIG. 2C).

Figure 2D:
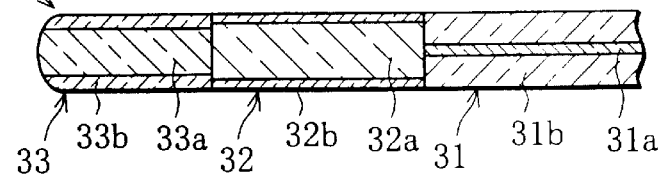

The coupling efficiency for connection with the semiconductor laser 20 can be lowered if the second fiber 33 is formed so that its distal end has a convex surface, as shown in FIG. 2D. The convex surface may be obtained mainly by the following three methods.

Figure 3:
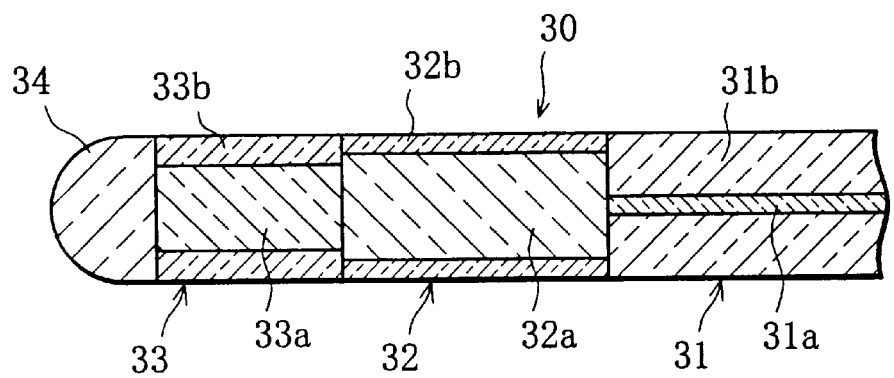
FIG. 3 is a side view showing another example of the lensed optical fiber.

In a first method, the distal end of the second fiber 33 is melted to form a hemispherical surface by heating based on electric discharge. In a second method, the distal end of the second fiber 33 is chemically etched by being dipped into a liquid that contains hydrofluoric acid and the like. In a third method, a coreless fiber 34 having a uniform refractive index, like the lensed optical fiber 30 shown in FIG. 3, is further connected to the distal end face of the second fiber 33 by fusion splicing, and an end portion of the fiber 34 is melted to form a hemispherical surface by heating based on electric discharge.

Figure 4:
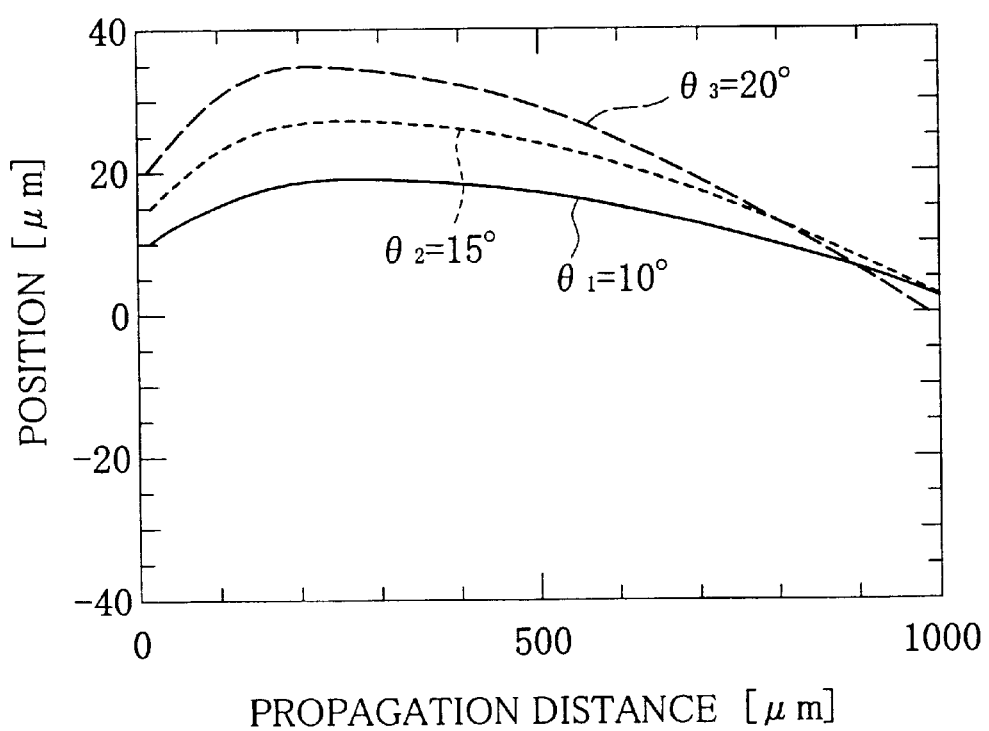
FIG. 4 is a distribution diagram showing the trajectories of light beams in first and second optical fibers in the laser module using the lensed optical fiber of the invention.
Figure 5:
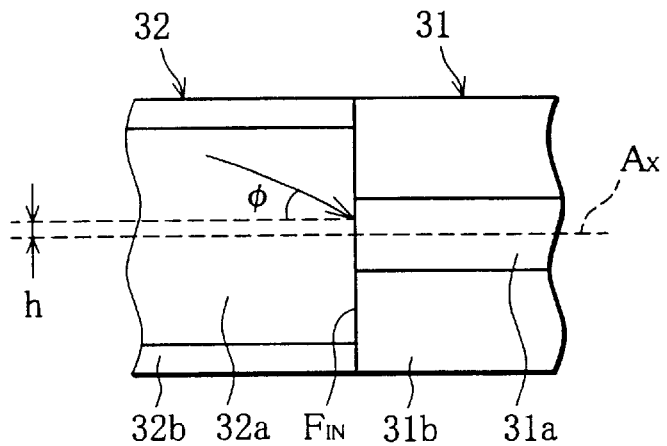
FIG. 5 is a view for illustrating the angle and position of incidence of the light beam upon an end face of a single-mode fiber according to the invention.
Figure 10:
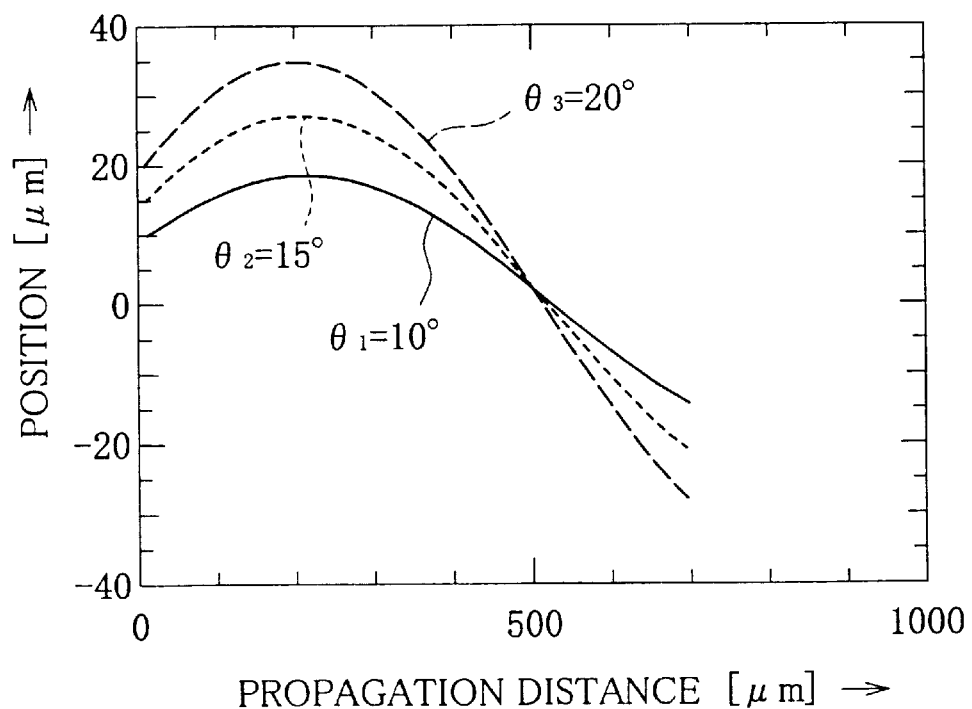
FIG. 10 is a diagram showing the trajectories of light beams propagating through the square-low index fiber of the conventional lensed optical fiber.

FIG. 4 shows the result of an examination on the trajectories of light beams emitted from the semiconductor laser 20 and transmitted through the first and second fibers 32 and 33, in the semiconductor laser module 10 using the lensed optical fiber 30 constructed in this manner. This examination was conducted under the same conditions as those for the case shown in FIG. 10. In FIG. 4, the axis of ordinate represents the position (μm) relative to the fiber axis, while the axis of abscissa represents the distance of propagation (μm) of each light beam measured from the position of incidence thereof upon the second fiber 33. The first and second fibers 32 and 33 are connected to each other at a point corresponding to the propagation distance of 200 μm.

As seen from FIG. 4, each light beam is focused (or approaches the fiber axis) at a point corresponding to the length of the first fiber 32 of about 785 μm, that is, the overall propagation distance of the lensed optical fiber 30 of about 985 μm. Since the curves shown in FIG. 4 are gentler than the ones shown in FIG. 10, an angle of incidence φ of the light beam from the first fiber 32 shown in FIG. 5 upon an end face of incidence FIN of the single-mode fiber 31, as viewed from a fiber axis Ax, is found to be narrower.

Figure 6:
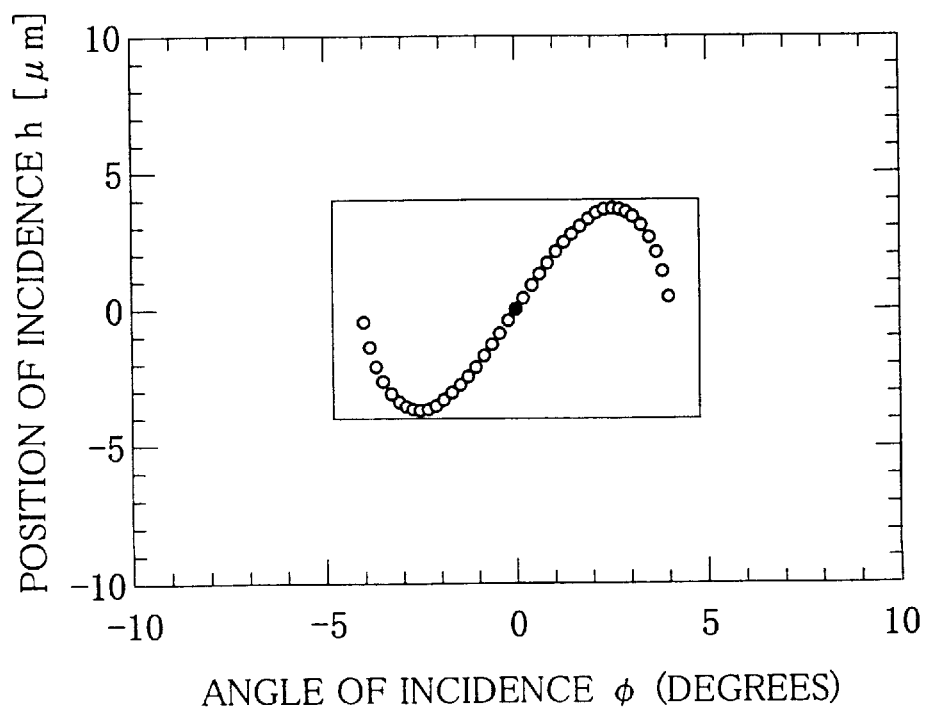
FIG. 6 is a diagram showing the angle and position of incidence which the light beam shows on the end face of the single-mode fiber when the angle of emission of the light beam emitted from the semiconductor laser is varied in the laser module using the lensed optical fiber according to the invention.
Figure 11:
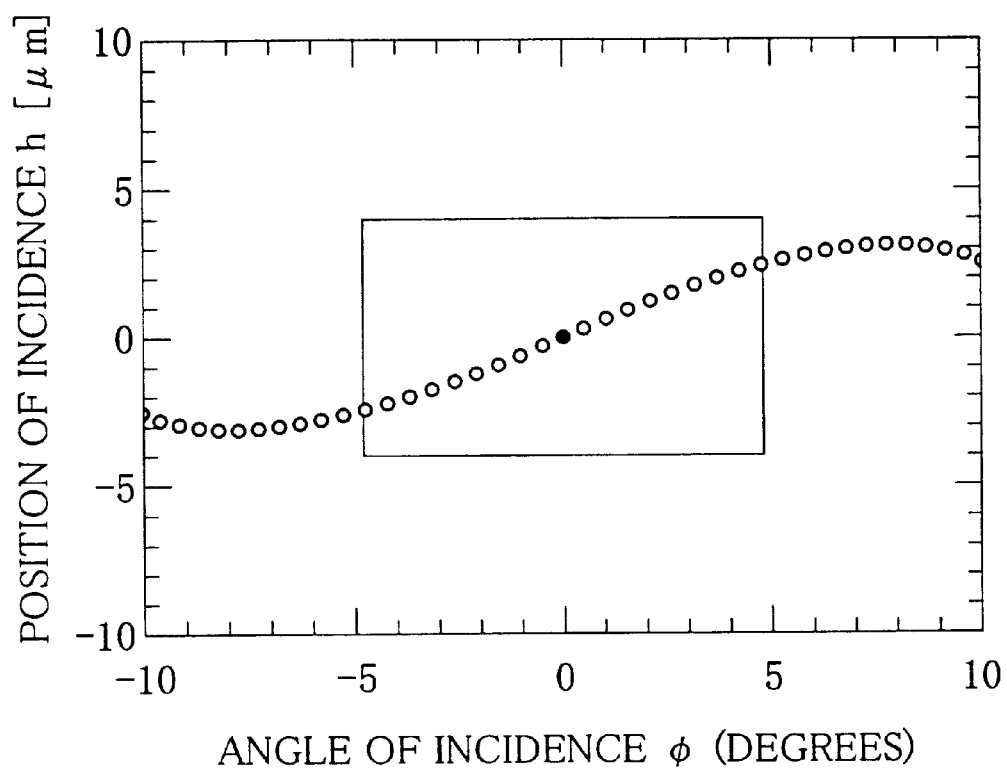
FIG. 11 is a diagram showing the angle and position of incidence which the light beam shows on an end face of a single-mode fiber when the angle of emission of the light beam emitted from the semiconductor laser is varied in the conventional lensed optical fiber including the square-low index fiber having the spherical distal end.

On the other hand, FIG. 6 shows the result of measurement of the optical condensing characteristic of the lensed optical fiber 30 at the propagation distance of 985 μm under the same conditions for the case shown in FIG. 11. This characteristic is given in terms of the angle of incidence φ (degrees) in the graph of FIG. 6, in which the axis of ordinate represents an incidence position h of the light beam in the radial direction measured from the fiber axis, and the axis of abscissa represents the fiber axis.

As seen from FIG. 6, the single-mode fiber 31 is coupled with 20 light beams that follow a light beam on the fiber axis represented by a black dot (●) in the center, the twentieth light beam being emitted from the semiconductor laser 20 at an angle of 20°. Thus, it is ascertained that the lensed optical fiber 30 can be formed without suffering a substantial coupling loss and the semiconductor laser module 10 using the fiber 30 enjoys a high coupling efficiency.

Figure 7:
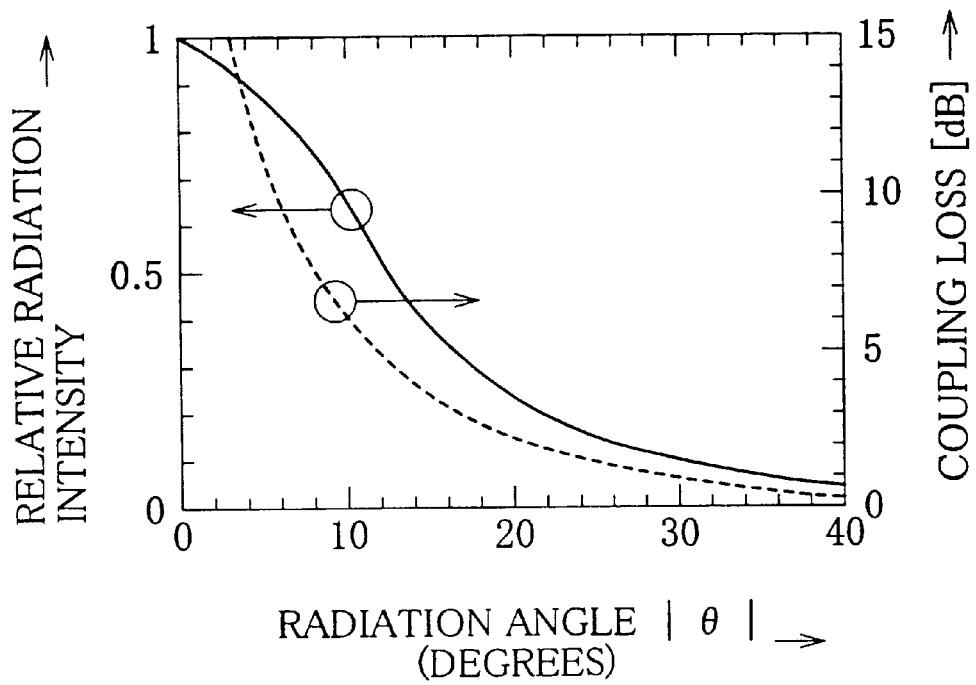
FIG. 7 shows characteristic curves representing the angular distribution of light beams emitted from a semiconductor laser and the relation between the coupling loss and the possible range for light receiving.
Figure 8:
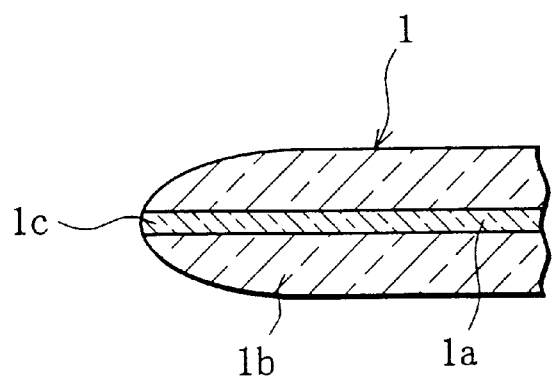
FIG. 8 is a side view showing a configuration of a conventional lensed optical fiber in which the distal end of a single-mode fiber is made convex by machining.
Figure 9:
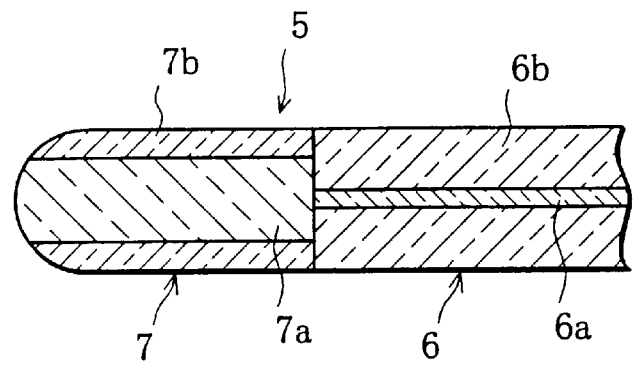
FIG. 9 is a side view showing a configuration of a conventional lensed optical fiber including a square-low index fiber having a spherical distal end.

FIG. 7 shows the result of measurement of angular distributions of the relative radiation intensity and coupling loss of a radiation emitted from the semiconductor laser 20 that is characterized by the full width at half maximum of 25°. In FIG. 7, the relative radiation intensity and coupling loss are based on the absolute value of a radiation angle θ or lateral extent on either side of the optical axis of the radiation. As seen from the result shown in FIG. 7, the coupling loss can be restricted to about 2 dB or less if light beams with radiation angles corresponding to |θ|=20° or more can be received.

What is claimed is:

1. A lensed optical fiber having a single-mode fiber including a core and a cladding, characterized in that first and second optical fibers, each including a core and a cladding, are connected to one end of the single-mode fiber in the order named, the core of the first optical fiber having a first square-law index distribution and a length substantially equal to ¼ of the meandering period of light propagating through the core or an odd multiple thereof, and the core of the second optical fiber having a second square-law index distribution and a meandering period different from that of the first optical fiber.

2. The lensed optical fiber according to claim 1, wherein the distal end of said second optical fiber has a convex surface.

3. The lensed optical fiber according to claim 1, wherein said second optical fiber is connected with an isotropic coreless fiber having a convex distal end.

4. A laser module characterized in that a laser source and the lensed optical fiber according to claim 1 are opposed to each other in a manner such that a predetermined working distance is kept between the second optical fiber and the laser source.

* * * * *